(12) United States Patent
Wright et al.

(10) Patent No.: US 10,990,775 B1
(45) Date of Patent: Apr. 27, 2021

(54) SCHEDULED CONNECT AND DISCONNECT OF CORDLESS SCANNER

(71) Applicant: ZEBRA TECHNOLOGIES CORPORATION, Lincolnshire, IL (US)

(72) Inventors: Mariya Wright, Cortland Manor, NY (US); Nina Feinstein, Hicksville, NY (US); Kenneth S. Bhella, Stony Brook, NY (US)

(73) Assignee: Zebra Technologies Corporation, Lincolnshire, IL (US)

( * ) Notice: Subject to any disclaimer, the term of this patent is extended or adjusted under 35 U.S.C. 154(b) by 0 days.

(21) Appl. No.: 16/750,755

(22) Filed: Jan. 23, 2020

(51) Int. Cl.
*G06K 7/10* (2006.01)
*G06K 17/00* (2006.01)

(52) U.S. Cl.
CPC ..... *G06K 7/10881* (2013.01); *G06K 7/10722* (2013.01); *G06K 7/10851* (2013.01); *G06K 17/0022* (2013.01)

(58) Field of Classification Search
None
See application file for complete search history.

(56) References Cited

U.S. PATENT DOCUMENTS

| | | | | |
|---|---|---|---|---|
| 6,732,933 | B2* | 5/2004 | Waxelbaum | G06K 17/0022 235/462.25 |
| 6,788,071 | B2* | 9/2004 | Vodyanoy | G01N 33/48728 324/602 |
| 2007/0284441 | A1* | 12/2007 | Walczyk | G07G 1/12 235/383 |
| 2014/0061306 | A1* | 3/2014 | Wu | G06K 19/0727 235/439 |
| 2018/0174123 | A1* | 6/2018 | Zhu | G06Q 20/20 |
| 2019/0073655 | A1* | 3/2019 | Barkan | G06K 7/1413 |

* cited by examiner

Primary Examiner — Kristy A Haupt
(74) Attorney, Agent, or Firm — Yuri Astvatsaturov (57) ABSTRACT

Techniques for connecting and disconnecting cordless scanners to/from host devices are disclosed herein. A transceiver of an example barcode reader is configured to attempt to establish a wireless connection with a host device (e.g., repeatedly) over a first period of time. Responsive to failing to establish the connection with the host device over the first period of time, the barcode reader enters a power-saving mode. During the power-saving mode at least one of the transceiver, a decode engine, a peripheral sensor, and an imaging engine of the barcode reader are deactivated. The wireless transceiver of the barcode reader is configured to attempt to re-establish the wireless connection with the host device after (i) a passage of a second period of time following the first period of time, wherein the second period of time is greater than the first period of time; or (ii) a receipt of an interrupt signal.

27 Claims, 3 Drawing Sheets

SCHEDULED CONNECT AND DISCONNECT OF CORDLESS SCANNER

BACKGROUND

Cordless barcode readers typically communicate with a host device (e.g., a workstation, such as a checkout workstation in a retail environment, a workstation on wheels (WOW cart) in a hospital environment, a manufacturing workstation, etc.) via a wireless connection (e.g., a Bluetooth® connection). For example, the cordless barcode reader may transmit indications of decoded barcodes to the host device via the wireless connection. Typical cordless barcode readers are configured to continuously or repeatedly attempt to connect to the host device until a connection is made. However, continuous or repeated connection attempts drain the cordless barcode reader's battery power, and can slow down other wireless networks operating in the same area, such as, e.g., WiFi networks.

For example, if the host device is being updated or rebooted, the host device may not be able to connect to the cordless barcode reader or may refuse connections to the cordless barcode reader during the update or reboot. Consequently, when a typical cordless barcode reader continuously or repeatedly attempts to connect to the host device during the update or reboot, the other wireless networks in the area will be slowed down, inconveniencing users of the other wireless networks for the duration of the update or the reboot. Furthermore, the cordless barcode reader's battery will drain, inconveniencing users of the cordless barcode reader.

Moreover, once a wireless connection is established, typical cordless barcode readers are configured to persistently stay connected to a particular host device as long as the cordless barcode reader remains within wireless connection range of the host device. However, this can create difficulties in situations where a user must quickly switch the cordless barcode reader between various closely-situated workstations (e.g., closely-situated checkout workstations in a retail environment, closely-situated WOW carts in a hospital environment, closely-situated workstations in a manufacturing environment, etc.). That is, the cordless barcode reader may remain persistently connected to a first workstation even as a user attempts to wirelessly connect the cordless barcode reader to a second workstation.

SUMMARY

In an embodiment, the present invention is a method for attempting to connect a barcode reader to a host device, comprising: attempting, by a wireless transceiver of the barcode reader, to establish a wireless connection with a host device a plurality of times over a first period of time; entering, by the barcode reader, a power-saving mode responsive to failing to establish the wireless connection with the host device over the first period of time wherein during the power-saving mode at least one of the transceiver, a decode engine, a peripheral sensor, and an imaging engine of the barcode reader are deactivated; and attempting, by the wireless transceiver of the barcode reader, to re-establish the wireless connection with the host device after (i) a passage of a second period of time following the first period of time, wherein the second period of time is greater than the first period of time; or (ii) a receipt of an interrupt signal.

In a variation of this embodiment, the method may include setting, by the barcode reader, a duration of the first period of time and/or a duration of the second period of time based on user input.

In another embodiment, the present invention is a method, comprising: establishing, by a barcode reader within wireless connection range of a first workstation and a second workstation of a logical grouping of workstations, a wireless connection with the first workstation; forcing a disconnect of the wireless connection between the barcode reader and the first workstation after a period of time during which the barcode reader is inactive; and establishing, by the barcode reader, a wireless connection with the second workstation after the period of time.

In a variation of this embodiment, the method may include setting, by the barcode reader, a duration of the period of time based on user input.

In yet another embodiment, the present invention is a barcode reader including a wireless transceiver, the barcode reader configured to: attempt, by the wireless transceiver, to establish a wireless connection with a host device a plurality of times over a first period of time; enter a power-saving mode responsive to failing to establish the wireless connection with the host device over the first period of time wherein during the power-saving mode at least one of the transceiver, a decode engine, a peripheral sensor, and an imaging engine of the barcode reader are deactivated; and attempt, by the wireless transceiver, to re-establish the wireless connection with the host device after (i) a passage of a second period of time following the first period of time, wherein the second period of time is greater than the first period of time; or (ii) a receipt of an interrupt signal.

In a variation of this embodiment, the barcode reader is further configured to set a duration of the first period of time and/or a duration of the second period of time based on user input.

In still yet another embodiment, the present invention is a barcode reader within wireless connection range of a first workstation and a second workstation of a logical grouping of workstations, the barcode reader configured to: establish a wireless connection with the first workstation; force a disconnect of the wireless connection with the first workstation after a period of time during which the barcode reader is inactive; and establish a wireless connection with the second workstation after the period of time.

In a variation of this embodiment, the barcode reader is further configured to set a duration of the period of time based on user input.

In yet another embodiment, the present invention is a system comprising: a host device; and a barcode reader including a wireless transceiver, the barcode reader configured to: attempt, by the wireless transceiver, to establish a wireless connection with a host device a plurality of times over a first period of time; enter a power-saving mode responsive to failing to establish the wireless connection with the host device over the first period of time wherein during the power-saving mode at least one of the transceiver, a decode engine, a peripheral sensor, and an imaging engine of the barcode reader are deactivated; and attempt, by the wireless transceiver, to re-establish the wireless connection with the host device after (i) a passage of a second period of time following the first period of time, wherein the second period of time is greater than the first period of time; or (ii) a receipt of an interrupt signal.

In a variation of this embodiment, the barcode reader is further configured to set a duration of the first period of time and/or a duration of the second period of time based on user input.

In still yet another embodiment, the present invention is a system comprising: a logical grouping of workstations including a first workstation and a second workstation; and a barcode reader within wireless connection range of the first workstation and the second workstation, the barcode reader configured to: establish a wireless connection with the first workstation; force a disconnect of the wireless connection with the first workstation after a period of time during which the barcode reader is inactive; and establish a wireless connection with the second workstation after the period of time.

In a variation of this embodiment, the barcode reader is further configured to set a duration of the period of time based on user input.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

As discussed above, cordless barcode readers typically communicate with a host device (e.g., a checkout worksta-tion in a retail environment, a workstation on wheels in a hospital environment, a manufacturing workstation, etc.) via a wireless connection (e.g., a Bluetooth® connection). For example, the cordless barcode reader may transmit indications of decoded barcodes to the host device via the wireless connection. Typical cordless barcode readers are configured to continuously or repeatedly attempt to connect to the host device until a connection is made. However, continuous or repeated connection attempts drain the cordless barcode reader's battery power, and can slow down other wireless networks operating in the same area, such as, e.g., WiFi networks.

For example, if the host device is being updated or rebooted, the host device may not be able to connect to the cordless barcode reader or may refuse connections to the cordless barcode reader during the update or reboot. Consequently, when a typical cordless barcode reader continuously or repeatedly attempts to connect to the host device during the update or reboot, the other wireless networks in the area will be slowed down, inconveniencing users of the other wireless networks for the duration of the update or the reboot. Furthermore, the cordless barcode reader's battery will drain, inconveniencing users of the cordless barcode reader.

Moreover, once a wireless connection is established, typical cordless barcode readers are configured to persistently stay connected to a particular host device as long as the cordless barcode reader remains within wireless connection range of the host device. However, this can create difficulties in situations where a user must frequently switch between workstations in a closely situated cluster or other logical grouping, such as, e.g., in a retail environment a user must quickly switch the cordless barcode reader between various closely-situated checkout workstations. That is, the cordless barcode reader may remain persistently connected to a first checkout workstation even as a user attempts to wirelessly connect the cordless barcode reader to a second checkout workstation.

The present techniques allow a user of a cordless barcode reader to schedule or otherwise pre-set the timing of the cordless barcode reader's disconnections and/or attempts to connect to the host device. That is, rather than the cordless barcode reader remaining connected to a given host device by default and repeatedly or continuously attempting to reconnect to a particular host device if the connection is lost, using the present techniques, the cordless barcode reader will connect or disconnect from a given host device based on settings programmed by the user of the cordless barcode reader.

For example, using the present techniques, a user could program a certain amount of time after which a cordless barcode reader will enter a low power mode during which the cordless barcode reader does not attempt to connect to the host device, and optionally deactivates other functionality as well. The user could further program an amount of time during which the cordless barcode reader will remain in the low power mode. For instance, a user could program the period of time during which the cordless barcode reader will remain in the low power mode based on the typical length of a scheduled update or reboot of the host device. Accordingly, the cordless barcode reader will not attempt to connect to the host device for the duration of the update or reboot. Advantageously, using the present techniques, the cordless barcode reader will conserve battery power for the duration of the update or reboot by not attempting to establish a wireless connection during the update or reboot (and by optionally deactivating other functionality of the cordless barcode reader during the update or reboot). Furthermore, other wireless networks in the area will not be slowed down by repeated or continuous connection attempts through the duration of the update or reboot.

As another example, using the present techniques, a user could program an amount of cordless barcode reader idle time (i.e., time during which the cordless barcode reader is not actively capturing images) after which the cordless barcode reader will automatically disconnect from a host device, such as a checkout workstation in a retail environment, a workstation on wheels in a hospital environment, a manufacturing workstation, etc., even if the host device remains within wireless range of the cordless barcode reader. Accordingly, if a cordless barcode reader wirelessly connected to a first workstation is idle for the programmed amount of time, the cordless barcode reader will force a disconnect from the first workstation, allowing for easy wireless connection to a second closely-situated workstation as needed by the user. Advantageously, the user does not need to manually disconnect the cordless barcode reader from a first workstation in order to wirelessly connect the cordless barcode reader to a closely-situated second workstation.

Figure 1:
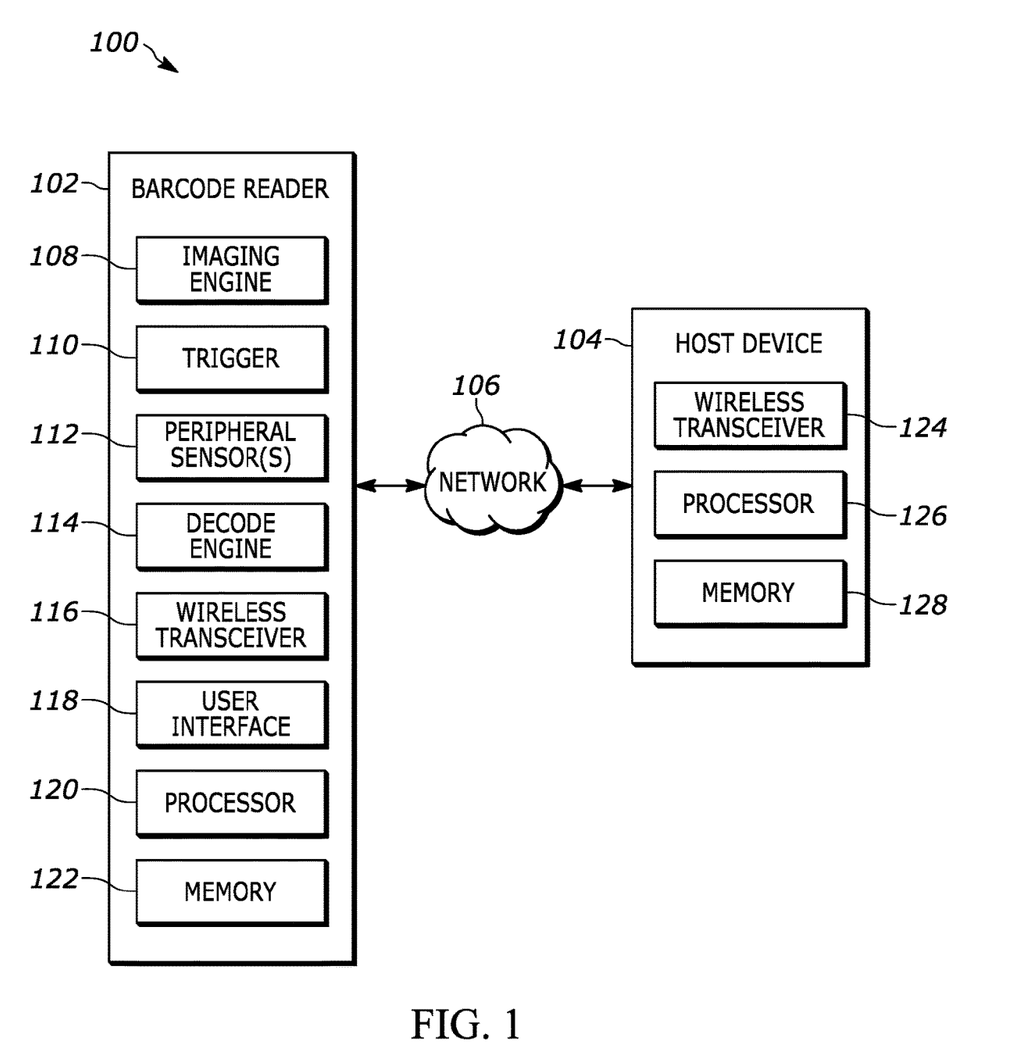
FIG. 1 illustrates a block diagram of an example system including a logic circuit for implementing the example methods and/or operations described herein, including techniques for attempting to connect a barcode reader to a host device.

FIG. 1 illustrates a block diagram of an example system 100 including a logic circuit for implementing the example methods and/or operations described herein, including techniques for attempting to connect a barcode reader to a host device.

The system 100 may include a barcode reader 102 and a host device 104, configured to communicate via a network 106 (e.g., a Bluetooth® or other short range wireless network).

The barcode reader 102 may include an imaging engine 108, a trigger 110, one or more peripheral sensors 112, a decode engine 114, a wireless transceiver 116, and/or a user interface 118, as well as a processor 120 and a memory 122. The barcode reader 102 may further include a network interface (not shown) that represents any suitable type of communication interface(s) (e.g., a Bluetooth® or other short range wireless interface) configured to operate in accordance with any suitable protocol(s) for communicating with the host device 104 via the network 106.

The imaging engine 108 (also called an imaging assembly in some examples) may include one or more cameras or other image sensors configured to capture images of barcodes (or other symbology or indicia) attached to target objects (e.g., products to be purchased). The trigger 110 may be configured to detect when a user is pulling the trigger 110, and may generate a signal indicating a trigger pull by the user. For example, the imaging engine 108 may capture images based on the signal indicating that a user has pulled the trigger 110. The one or more peripheral sensors 112 may include, e.g., acceleration sensors, gyroscopic sensors, or other motion sensors. The decode engine 114 may be configured to analyze the images captured by the imaging engine 108 to decode barcodes (or other symbology or indicia) depicted in the images.

The wireless transceiver 116 may be configured to establish a wireless connection with the host device 104 (e.g., a Bluetooth® connection via the network 106) and transmit indications of the decoded barcodes to the host device 104 via the established wireless connection.

The user interface 118 may be configured to receive settings and other instructions from users of the barcode reader 102. For instance, a user may program the barcode reader 102, via the user interface 118, to enter a low-power mode after a certain time interval of attempting to establish the wireless connection has passed. While in the low-power mode, the barcode reader 102 may cease attempting to establish a wireless connection with the host device 104. Furthermore, during the low-power mode, the barcode reader 102 may deactivate various functionality, such as, e.g., the imaging engine 108, one or more peripheral sensors 112, the decode engine 114, and/or the wireless transceiver 116. For example, the user could set the time interval after which the barcode reader 102 will enter the low-power mode as 30 seconds, or one minute, or two minutes, etc., via the user interface 118.

Furthermore, a user may program the barcode reader 102, via the user interface 118, to return to a normal power mode (from the low-power mode) and attempt to establish the wireless connection again (and reactivate other deactivated functionality such as, e.g., the imaging engine 108, one or more peripheral sensors 112, the decode engine 114, and/or the wireless transceiver 116) after a certain time interval has passed since the last attempt. For instance, the user could set the time interval as one hour, two hours, eight hours, etc., via the user interface 118. For example, user could select the time interval based on a known duration of an upcoming system upgrade or reboot during which connection with the host device will be impossible.

Figure 3:
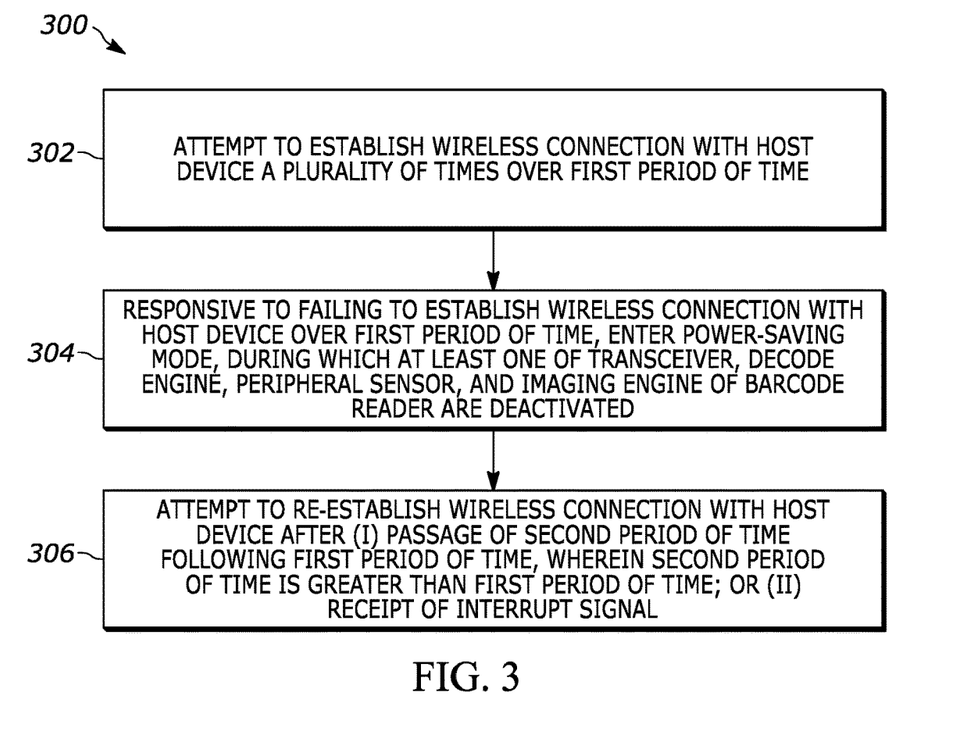
FIG. 3 illustrates a block diagram of an example process as may be implemented by the logic circuit of FIG. 1, for implementing example methods and/or operations described herein, including techniques for attempting to connect a barcode reader to a host device.
Figure 4:
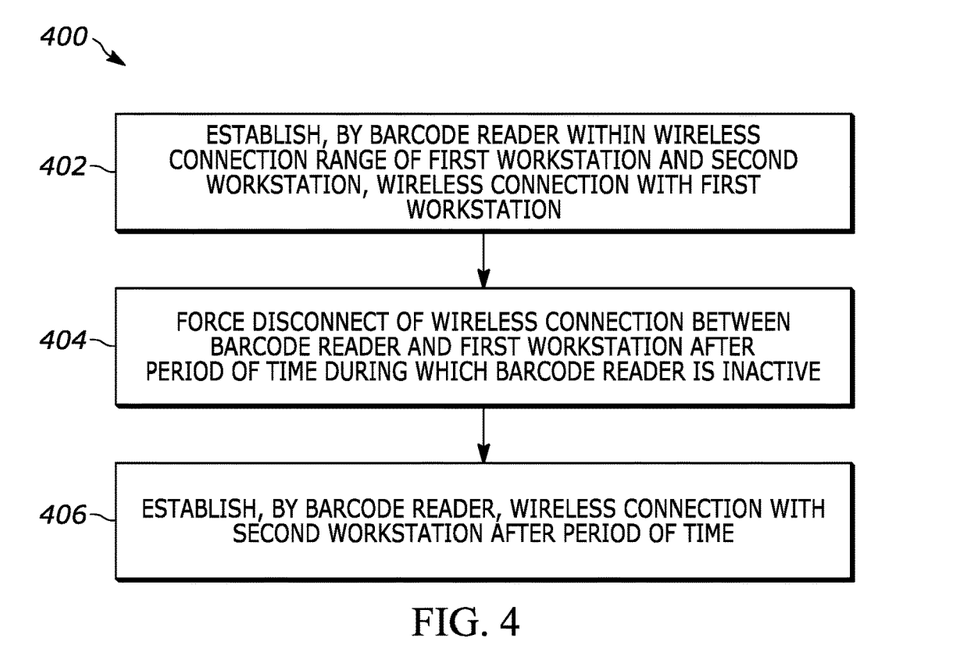
FIG. 4 illustrates a block diagram of another example process as may be implemented by the logic circuit of FIG. 2, for implementing example methods and/or operations described herein, including techniques for forcing a disconnect of a wireless connection between a cordless barcode reader and a first workstation so that the cordless barcode reader can connect to a second workstation.

The processor 120, which may be, for example, one or more microprocessors, controllers, and/or any suitable type of processors, may interact with the memory 122 accessible by the one or more processors 120 (e.g., via a memory controller) to obtain, for example, machine-readable instructions stored in the memory 122 corresponding to, for example, the operations represented by the flowcharts of this disclosure, including those of FIGS. 3 and 4. In particular, the instructions stored in the memory 122, when executed by the processor 120, may cause the barcode reader 102 to wirelessly transmit data (e.g., data associated with images captured by the imaging engine 108) to the host device 104 (e.g., via the wireless transceiver 116) when the barcode reader 102 is wirelessly connected to the host device 104. Furthermore, the instructions stored in the memory 122, when executed by the processor 120 may cause the barcode reader 102 to enter or exit a low-power mode at certain times or after certain time intervals based on settings input by users, e.g., via the user interface 118, as discussed above. For instance, the instructions stored in the memory 122, when executed by the processor 120, may cause the barcode reader 102 to enter the low-power mode after a first period of time during which the barcode reader 102 attempts, and fails, to establish a wireless connection with the host device 104. Entering the low-power mode may include ceasing attempts to establish the wireless connection with the host device 104, and/or deactivating one or more of the imaging engine 108, peripheral sensors 112, decode engine 114, and/or wireless transceiver 116.

Furthermore, the instructions stored in the memory 122, when executed by the processor 120, may cause the barcode reader 102 to leave the low-power mode after the passage of a second period of time in the low-power mode. For instance, the second period of time may be a longer period of time than the first period of time. In some examples, the instructions stored in the memory 122, when executed by the processor 120, may cause the barcode reader 102 to leave the low-power mode based on a signal generated by the trigger 110 indicating that a user has manually activated the trigger 110. Leaving the low-power mode may include resuming attempts to establish the wireless connection with the host device 104, and/or reactivating one or more of the imaging engine 108, peripheral sensors 112, decode engine 114, and/or wireless transceiver 116.

Additionally or alternatively, machine-readable instructions corresponding to the example operations described herein may be stored on one or more removable media (e.g., a compact disc, a digital versatile disc, removable flash memory, etc.) that may be coupled to the barcode reader 102 to provide access to the machine-readable instructions stored thereon.

The host device 104 may include a wireless transceiver 124, as well as a processor 126 and a memory 128. The host device 104 may further include a network interface (not shown) that represents any suitable type of communication interface(s) (e.g., a Bluetooth® or other short range wireless interface) configured to operate in accordance with any suitable protocol(s) for communicating with the barcode reader 102 via the network 106.

The wireless transceiver 124 may be configured to establish a wireless connection with the barcode reader 102 (e.g., a Bluetooth® connection via the network 106), and receive indications of the decoded barcodes transmitted by the barcode reader 102 via the established wireless connection.

The processor 126, which may be, for example, one or more microprocessors, controllers, and/or any suitable type of processors, may interact with the memory 128 accessible by the one or more processors 126 (e.g., via a memory controller) to obtain, for example, machine-readable instructions stored in the memory 128 corresponding to, for example, the operations represented by the flowcharts of this disclosure, including those of FIGS. 3 and 4. In particular, the instructions stored in the memory 128, when executed by the processor 126, may cause the processor 126 to receive data (e.g., barcode decode data) transmitted by the barcode reader 102 (e.g., via the network 106).

Furthermore, in some examples, in which the host device 104 includes a user interface (not shown), the instructions stored on the memory 128, when executed by the processor 126, may cause the processor 126 to receive settings and other instructions from users of the barcode reader 102 or the host device 104, e.g., as discussed with respect to the user interface 118. In such instances, the instructions stored on the memory 128, when executed by the processor 126, may cause the processor 126 to transmit indications of settings or other instructions from the user to the barcode reader 102.

Additionally or alternatively, machine-readable instructions corresponding to the example operations described herein may be stored on one or more removable media (e.g., a compact disc, a digital versatile disc, removable flash memory, etc.) that may be coupled to the host device 104 to provide access to the machine-readable instructions stored thereon.

Figure 2:
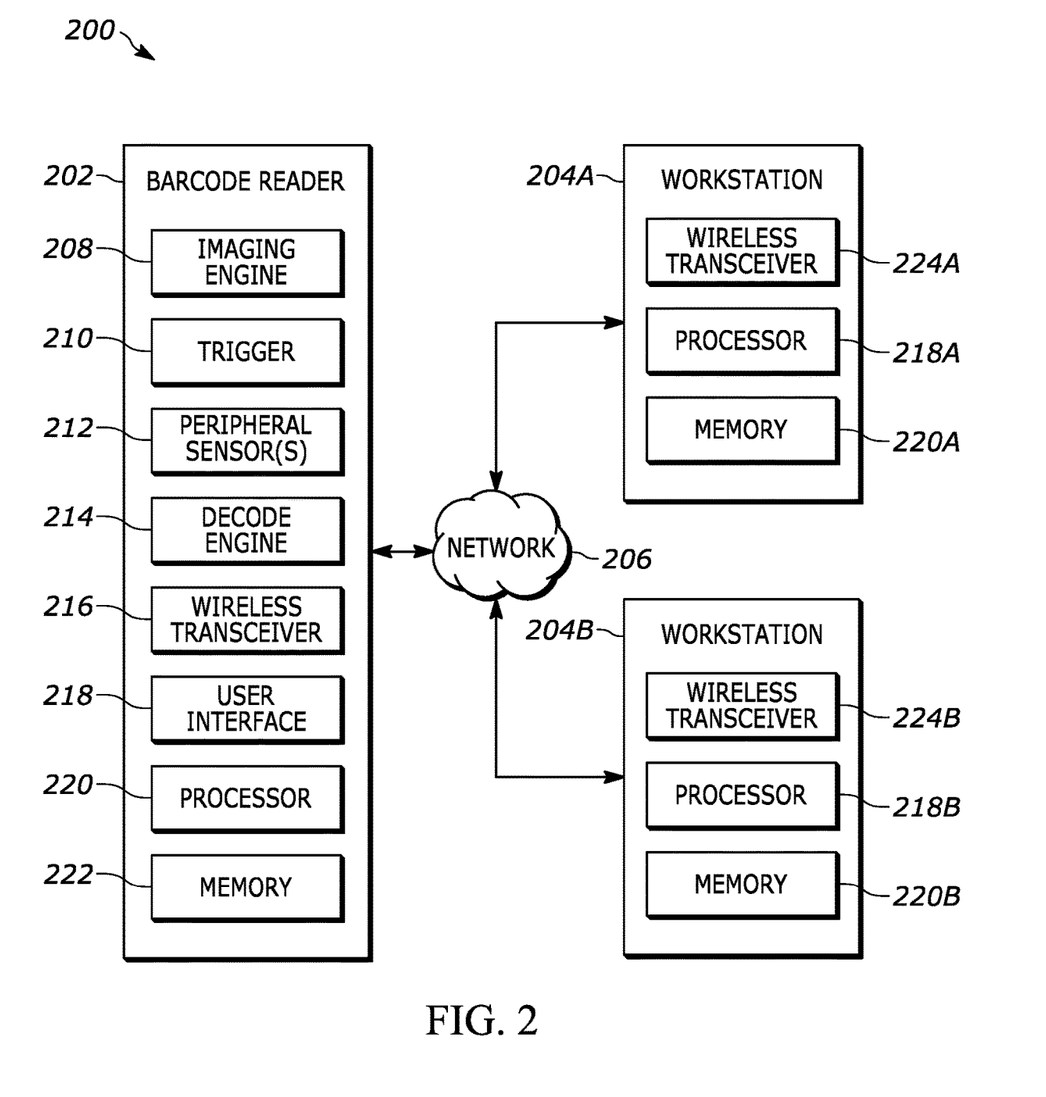
FIG. 2 illustrates a block diagram of an example system including a logic circuit for implementing the example methods and/or operations described herein, including techniques for forcing a disconnect of a wireless connection between a cordless barcode reader and a first workstation so that the cordless barcode reader can connect to a second workstation.

FIG. 2 illustrates a block diagram of an example system 200 including a logic circuit for implementing the example methods and/or operations described herein, including techniques for forcing a disconnect of a wireless connection between a cordless barcode reader and a first workstation so that the cordless barcode reader can connect to a second workstation.

The system 200 may include a barcode reader 202 and two or more workstations 204A, 204B (e.g., a cluster or other logical grouping of workstations) configured to communicate via a network 106 (e.g., a Bluetooth® or other short range wireless network). Although only two workstations 204A, 204B are shown in FIG. 2, there may be any number of workstations in various embodiments.

The barcode reader 202 may include an imaging engine 208, a trigger 210, one or more peripheral sensors 212, a decode engine 214, a wireless transceiver 216, and/or a user interface 218, as well as a processor 220 and a memory 222. The barcode reader 202 may further include a network interface (not shown) that represents any suitable type of communication interface(s) (e.g., a Bluetooth® or other short range wireless interface) configured to operate in accordance with any suitable protocol(s) for communicating with the workstations 204A, 204B via the network 206.

The imaging engine 208 (also called an imaging assembly in some examples) may include one or more cameras or other image sensors configured to capture images of barcodes (or other symbology or indicia) attached to target objects (e.g., products to be purchased). The trigger 210 may be configured to detect when a user is pulling the trigger 210, and may generate a signal indicating a trigger pull by the user. For example, the imaging engine 208 may capture images based on the signal indicating that a user has pulled the trigger 210. The one or more peripheral sensors 212 may include, e.g., acceleration sensors, gyroscopic sensors, or other motion sensors. The decode engine 214 may be configured to analyze the images captured by the imaging engine 208 to decode barcodes (or other symbology or indicia) depicted in the images.

The wireless transceiver 216 may be configured to establish a wireless connection with one of the workstations 204A, 204B (e.g., a Bluetooth® connection via the network 106), and transmit indications of the decoded barcodes to the workstation 204A, 204B via the established wireless connection.

The user interface 218 may be configured to receive settings and other instructions from users of the barcode reader 202. For instance, a user may program the barcode reader 202, via the user interface 218, to force a disconnect from a workstation 204A, 204B to which the barcode reader 202 is currently wirelessly connected based on the barcode reader 202 being idle or inactive (e.g., not actively capturing images) for a certain period of time. In particular, the user may select the certain period of time after which the barcode reader 202 forces the disconnect with the workstation 204A, 204B. For instance, the user may select a 10-second period of time, a 30-second period of time, etc., after which the barcode reader 202 will force the disconnect with the workstation 204A, 204B.

The processor 220, which may be, for example, one or more microprocessors, controllers, and/or any suitable type of processors, may interact with the memory 222 accessible by the one or more processors 220 (e.g., via a memory controller) to obtain, for example, machine-readable instructions stored in the memory 222 corresponding to, for example, the operations represented by the flowcharts of this disclosure, including those of FIGS. 3 and 4. In particular, the instructions stored in the memory 222, when executed by the processor 220, may cause the barcode reader 202 to wirelessly transmit data (e.g., data associated with images captured by the imaging engine 208) to a workstation 204A, 204B (e.g., via the wireless transceiver 216) when the barcode reader 202 is wirelessly connected to the workstation 204A, 204B.

Furthermore, the instructions stored in the memory 222, when executed by the processor 220, may cause the barcode reader 202 to force a disconnect of the wireless connection between the barcode scanner 202 and a first workstation 204A after a certain period of idle or inactive time during which the barcode reader 202 is not actively capturing images. For instance, in some examples, as discussed above, the period of idle time after which the barcode reader 202 forces a disconnect with the first workstation 204A may be set by a user, while in other examples the period of idle time after which the barcode reader 202 forces a disconnect with the first workstation 204A may be pre-set. Moreover, the instructions stored in the memory 222, when executed by the processor 220, may cause the barcode reader 202 to establish a wireless connection with a second workstation 204B after the forced disconnect with the first workstation 204A.

Additionally, or alternatively, machine-readable instructions corresponding to the example operations described herein may be stored on one or more removable media (e.g., a compact disc, a digital versatile disc, removable flash memory, etc.) that may be coupled to the barcode reader 202 to provide access to the machine-readable instructions stored thereon.

The workstations 204A, 204B (which may be, e.g., checkout workstations in a retail environment, workstations on wheels (WOW carts) in a hospital environment, manufacturing workstations, etc.) may each include a respective wireless transceiver 224A, 224B as well as a processor 226A, 226B and a memory 228A, 228B. The workstations 204A, 204B may each further include a respective network interface (not shown) that represents any suitable type of communication interface(s) (e.g., a Bluetooth® or other short range wireless interface) configured to operate in accordance with any suitable protocol(s) for communicating with the barcode reader 202 via the network 206.

The wireless transceivers 224A, 224B may each be configured to establish a wireless connection with the barcode reader 202 (e.g., a Bluetooth® connection via the network 206), and receive indications of the decoded barcodes transmitted by the barcode reader 202 via the established wireless connection.

The processors 226A, 226B which may be, for example, one or more microprocessors, controllers, and/or any suitable type of processors, may interact with respective memories 228A, 228B accessible by the respective one or more processors 226A, 226B (e.g., via a memory controller) to obtain, for example, machine-readable instructions stored in a respective memory 228A, 228B corresponding to, for example, the operations represented by the flowcharts of this disclosure, including those of FIGS. 3 and 4. In particular, the instructions stored in the memories 228A, 228B, when executed by the respective processors 226A, 226B, may cause the respective processors 226A, 226B to receive data (e.g., barcode decode data) transmitted by the barcode reader 202 (e.g., via the network 206).

Furthermore, in some examples, in which the workstations 204A, 204B include user interfaces (not shown), the instructions stored on the memories 228A, 228B when executed by the respective processors 226A, 226B, may cause the processors 226A, 226B to receive settings and other instructions from users of the barcode reader 202 or workstations 204A, 204B, e.g., as discussed with respect to the user interface 218. In such instances, the instructions stored on the memories 228A, 228B, when executed by the respective processors 226A, 226B, may cause the processors 226A, 226B to transmit indications of settings or other instructions from the user to the barcode reader 202.

Additionally or alternatively, machine-readable instructions corresponding to the example operations described herein may be stored on one or more removable media (e.g., a compact disc, a digital versatile disc, removable flash memory, etc.) that may be coupled to the workstations 204A, 204B to provide access to the machine-readable instructions stored thereon.

FIG. 3 illustrates a block diagram of an example process 300 as may be implemented by the logic circuit of FIG. 1, for implementing example methods and/or operations described herein, including techniques for attempting to connect a barcode reader to a host device, as may be performed by the system 100, barcode reader 102, and/or host device 104 of FIG. 1.

At a process 302, a wireless transceiver of a barcode reader may attempt to establish a wireless connection (e.g., a Bluetooth® connection) with a host device a plurality of times over a first period of time. In some examples, the first period of time may be a period of time that is set by a user, e.g., via a user interface of the barcode reader or a user interface of the host device. For example, the user may set the first period of time as 15 seconds, 30 seconds, one minute, five minutes, etc.

At a process 304, the barcode reader may enter a power-saving mode responsive to failing to establish the wireless connection with the host device over the first period of time. During the power-saving mode at least one of the transceiver, a decode engine, a peripheral sensor, and an imaging engine of the barcode reader may be deactivated. In particular, during the power-saving mode, the barcode reader may cease any attempts to establish the wireless connection with the host device.

At a process 306, the wireless transceiver of the barcode reader may attempt to re-establish the wireless connection with the host device after the passage of a second period of time following the first period of time or after a receipt of an interrupt signal. Additionally, after the passage of the second period of time following the first period of time or after a receipt of an interrupt signal, two or more of the transceiver, the decode engine, or the peripheral sensor that were deactivated during the power-saving mode may be reactivated.

The second period of time will generally be longer than the first period of time, and may be set by a user, e.g., via a user interface of the barcode reader or a user interface of the host device. For example, the user may set the second period of time as one hour, two hours, five hours, etc. In some examples, the user may select the second period of time based on the predicted length of a known downtime of the host device (e.g., a planned reboot or update). The interrupt signal may be an indication that a user is attempting to use the barcode reader. For instance, the interrupt signal may be generated responsive to manual activation of a trigger of the barcode reader by a user.

FIG. 4 illustrates a block diagram of another example process 400 as may be implemented by the logic circuit of FIG. 2, for implementing example methods and/or operations described herein, including techniques for forcing a disconnect of a wireless connection between a cordless barcode reader and a first workstation so that the cordless barcode reader can connect to a second workstation, as may be performed by the system 200, barcode reader 202 and/or workstations 204A, 204B of FIG. 2.

At a process 402, a barcode reader within wireless connection range (e.g., within Bluetooth® connection range) of a first workstation and a second workstation may establish a wireless connection (e.g., a Bluetooth® connection) with the first workstation. For example, the first and second workstations may be part of a closely-situated logical grouping of workstations, e.g., a cluster of checkout workstations in a retail environment, a cluster of workstations on wheels (WOW carts) in a hospital environment, a cluster of manufacturing workstations, etc. For example, the barcode reader may exist in a retail environment in which a user (such as, e.g., a retail manager) must switch between closely-situated checkout workstations as needed, e.g., to approve certain types of purchases, troubleshoot employee or customer errors, etc.

At a process 404, the barcode reader may force a disconnect of the wireless connection between the barcode reader and the first workstation after a period of time during which the barcode reader is inactive or idle (e.g., not actively capturing images of barcodes). In some examples, the period of time may be a period of time that is set by a user, e.g., via a user interface of the barcode reader. For example, the user may set the first period of time as 15 seconds, 30 seconds, one minute, five minutes, etc. In particular, the barcode reader may force the disconnect while the barcode reader is still within wireless range of both the first workstation and the second workstation. Furthermore, the barcode reader may force the disconnect without additional input from a user of the barcode reader. That is, the user may not be required to push a button or make any other selection to cause the barcode reader to force the disconnect after the period of inactive time.

At a process 406, the barcode reader may establish a wireless connection with the second workstation after the period of time.

In some examples, the process 400 may be implemented in a barcode reader within wireless connection range of more than two workstations (e.g., a cluster of workstations further including a third workstation, a fourth workstation, a fifth workstation, etc., in addition to the first and second workstations). For instance, if the set period of inactive time passes while the barcode reader is wirelessly connected to the second workstation, the barcode reader may force a disconnect of the wireless connection between the barcode reader and the second workstation, and may establish a wireless connection with the third workstation, and so on. In some examples, the user may select a particular workstation to which the barcode reader is to wirelessly connect after each forced disconnect.

The above description refers to a block diagram of the accompanying drawings. Alternative implementations of the example represented by the block diagram includes one or more additional or alternative elements, processes and/or devices. Additionally or alternatively, one or more of the example blocks of the diagram may be combined, divided, re-arranged or omitted. Components represented by the blocks of the diagram are implemented by hardware, software, firmware, and/or any combination of hardware, software and/or firmware. In some examples, at least one of the components represented by the blocks is implemented by a logic circuit. As used herein, the term "logic circuit" is expressly defined as a physical device including at least one hardware component configured (e.g., via operation in accordance with a predetermined configuration and/or via execution of stored machine-readable instructions) to control one or more machines and/or perform operations of one or more machines. Examples of a logic circuit include one or more processors, one or more coprocessors, one or more microprocessors, one or more controllers, one or more digital signal processors (DSPs), one or more application specific integrated circuits (ASICs), one or more field programmable gate arrays (FPGAs), one or more microcontroller units (MCUs), one or more hardware accelerators, one or more special-purpose computer chips, and one or more system-on-a-chip (SoC) devices. Some example logic circuits, such as ASICs or FPGAs, are specifically configured hardware for performing operations (e.g., one or more of the operations described herein and represented by the flowcharts of this disclosure, if such are present). Some example logic circuits are hardware that executes machine-readable instructions to perform operations (e.g., one or more of the operations described herein and represented by the flowcharts of this disclosure, if such are present). Some example logic circuits include a combination of specifically configured hardware and hardware that executes machine-readable instructions. The above description refers to various operations described herein and flowcharts that may be appended hereto to illustrate the flow of those operations. Any such flowcharts are representative of example methods disclosed herein. In some examples, the methods represented by the flowcharts implement the apparatus represented by the block diagrams. Alternative implementations of example methods disclosed herein may include additional or alternative operations. Further, operations of alternative implementations of the methods disclosed herein may combined, divided, re-arranged or omitted. In some examples, the operations described herein are implemented by machine-readable instructions (e.g., software and/or firmware) stored on a medium (e.g., a tangible machine-readable medium) for execution by one or more logic circuits (e.g., processor(s)). In some examples, the operations described herein are implemented by one or more configurations of one or more specifically designed logic circuits (e.g., ASIC(s)). In some examples the operations described herein are implemented by a combination of specifically designed logic circuit(s) and machine-readable instructions stored on a medium (e.g., a tangible machine-readable medium) for execution by logic circuit(s).

As used herein, each of the terms "tangible machine-readable medium," "non-transitory machine-readable medium" and "machine-readable storage device" is expressly defined as a storage medium (e.g., a platter of a hard disk drive, a digital versatile disc, a compact disc, flash memory, read-only memory, random-access memory, etc.) on which machine-readable instructions (e.g., program code in the form of, for example, software and/or firmware) are stored for any suitable duration of time (e.g., permanently, for an extended period of time (e.g., while a program associated with the machine-readable instructions is executing), and/or a short period of time (e.g., while the machine-readable instructions are cached and/or during a buffering process)). Further, as used herein, each of the terms "tangible machine-readable medium," "non-transitory machine-readable medium" and "machine-readable storage device" is expressly defined to exclude propagating signals. That is, as used in any claim of this patent, none of the terms "tangible machine-readable medium," "non-transitory machine-readable medium," and "machine-readable storage device" can be read to be implemented by a propagating signal.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. Additionally, the described embodiments/examples/implementations should not be interpreted as mutually exclusive, and should instead be understood as potentially combinable if such combinations are permissive in any way. In other words, any feature disclosed in any of the aforementioned embodiments/examples/implementations may be included in any of the other aforementioned embodiments/examples/implementations.

The benefits, advantages, solutions to problems, and any element(s) that may cause any benefit, advantage, or solution to occur or become more pronounced are not to be construed as a critical, required, or essential features or elements of any or all the claims. The claimed invention is defined solely by the appended claims including any amendments made during the pendency of this application and all equivalents of those claims as issued.

Moreover, in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains ...a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter may lie in less than all features of a single disclosed embodiment. Thus, the following claims are hereby incorporated into the Detailed Description, with each claim standing on its own as a separately claimed subject matter.

The claims are:

1. A method for attempting to connect a barcode reader to a host device, comprising:
attempting, by a wireless transceiver of the barcode reader, to establish a wireless connection with a host device a plurality of times over a first period of time;
entering, by the barcode reader, a power-saving mode responsive to failing to establish the wireless connection with the host device over the first period of time wherein during the power-saving mode at least one of the transceiver, a decode engine, a peripheral sensor, and an imaging engine of the barcode reader are deactivated; and
attempting, by the wireless transceiver of the barcode reader, to re-establish the wireless connection with the host device after (i) a passage of a second period of time following the first period of time, wherein the second period of time is greater than the first period of time; or (ii) a receipt of an interrupt signal.

2. The method of claim 1, further comprising:
setting, by the barcode reader, a duration of the first period of time based on user input.

3. The method of claim 1, further comprising:
setting, by the barcode reader, a duration of the second period of time based on user input.

4. The method of claim 1, wherein the interrupt signal is generated responsive to manual activation of a trigger of the barcode reader by a user.

5. The method of claim 1, further comprising reactivating two or more of the transceiver, the decode engine, the peripheral sensor, after (i) the passage of the second period of time following the first period of time or (ii) the receipt of the interrupt signal.

6. The method of claim 1, wherein the wireless connection is a Bluetooth connection.

7. A method, comprising:
establishing, by a barcode reader within wireless connection range of a first workstation and a second workstation of a logical grouping of workstations, a wireless connection with the first workstation;
forcing a disconnect of the wireless connection between the barcode reader and the first workstation after a period of time during which the barcode reader is inactive; and
establishing, by the barcode reader, a wireless connection with the second workstation after the period of time.

8. The method of claim 7, further comprising:
setting, by the barcode reader, a duration of the period of time based on user input.

9. The method of claim 7, wherein the wireless connection is a Bluetooth connection.

10. A barcode reader including a wireless transceiver, the barcode reader configured to:
attempt, by the wireless transceiver, to establish a wireless connection with a host device a plurality of times over a first period of time;
enter a power-saving mode responsive to failing to establish the wireless connection with the host device over the first period of time wherein during the power-saving mode at least one of the transceiver, a decode engine, a peripheral sensor, and an imaging engine of the barcode reader are deactivated; and
attempt, by the wireless transceiver, to re-establish the wireless connection with the host device after (i) a passage of a second period of time following the first period of time, wherein the second period of time is greater than the first period of time; or (ii) a receipt of an interrupt signal.

11. The barcode reader of claim 10, the barcode reader further configured to set a duration of the first period of time based on user input.

12. The barcode reader of claim 10, the barcode reader further configured to set a duration of the second period of time based on user input.

13. The barcode reader of claim 10, wherein the interrupt signal is generated responsive to manual activation of a trigger of the barcode reader by a user.

14. The barcode reader of claim 10, further configured to reactivate two or more of the transceiver, the decode engine, the peripheral sensor, and the imaging engine, after (i) the passage of the second period of time following the first period of time or (ii) the receipt of the interrupt signal.

15. The barcode reader of claim 10, wherein the wireless connection is a Bluetooth connection.

16. A barcode reader within wireless connection range of a first workstation and a second workstation of a logical grouping of workstations, the barcode reader configured to:
  establish a wireless connection with the first workstation;
  force a disconnect of the wireless connection with the first workstation after a period of time during which the barcode reader is inactive; and
  establish a wireless connection with the second workstation after the period of time.

17. The barcode reader of claim 16, the barcode reader is further configured to set a duration of the period of time based on user input.

18. The barcode reader of claim 16, wherein the wireless connection is a Bluetooth connection.

19. A system comprising:
  a host device; and
  a barcode reader including a wireless transceiver, the barcode reader configured to:
  attempt, by the wireless transceiver, to establish a wireless connection with a host device a plurality of times over a first period of time;
  enter a power-saving mode responsive to failing to establish the wireless connection with the host device over the first period of time wherein during the power-saving mode at least one of the transceiver, a decode engine, a peripheral sensor, and an imaging engine of the barcode reader are deactivated; and
  attempt, by the wireless transceiver, to re-establish the wireless connection with the host device after (i) a passage of a second period of time following the first period of time, wherein the second period of time is greater than the first period of time; or (ii) a receipt of an interrupt signal.

20. The system of claim 19, wherein the barcode reader is further configured to set a duration of the first period of time based on user input.

21. The system of claim 19, wherein the barcode reader is further configured to set a duration of the second period of time based on user input.

22. The system of claim 19, wherein the interrupt signal is generated responsive to manual activation of a trigger of the barcode reader by a user.

23. The barcode reader of claim 19, further configured to reactivate two or more of the transceiver, the decode engine, the peripheral sensor, and the imaging engine, after (i) the passage of the second period of time following the first period of time or (ii) the receipt of the interrupt signal.

24. The barcode reader of claim 19, wherein the wireless connection is a Bluetooth connection.

25. A system comprising:
  a logical grouping of workstations including a first workstation and a second workstation; and
  a barcode reader within wireless connection range of the first workstation and the second workstation, the barcode reader configured to:
  establish a wireless connection with the first workstation;
  force a disconnect of the wireless connection with the first workstation after a period of time during which the barcode reader is inactive; and
  establish a wireless connection with the second workstation after the period of time.

26. The system of claim 25, wherein the barcode reader is further configured to set a duration of the period of time based on user input.

27. The system of claim 25, wherein the wireless connection is a Bluetooth connection.

\* \* \* \* \*